E. C. FEARNOW.
CONTAINER FOR TRANSPORTING LIVE FISH.
APPLICATION FILED MAR. 6, 1922.

1,419,549.

Patented June 13, 1922.
3 SHEETS—SHEET 1.

Inventor
Edgar C. Fearnow,

E. C. FEARNOW.
CONTAINER FOR TRANSPORTING LIVE FISH.
APPLICATION FILED MAR. 6, 1922.

1,419,549.

Patented June 13, 1922.

Inventor
Edgar C. Fearnow

UNITED STATES PATENT OFFICE.

EDGAR C. FEARNOW, OF CAPITOL HEIGHTS, MARYLAND.

CONTAINER FOR TRANSPORTING LIVE FISH.

1,419,549.  Specification of Letters Patent.  Patented June 13, 1922.

Application filed March 6, 1922. Serial No. 541,500.

*To all whom it may concern:*

Be it known that I, EDGAR C. FEARNOW, a citizen of the United States, residing at Capitol Heights, in the county of Prince Georges and State of Maryland, have invented certain new and useful Improvements in Containers for Transporting Live Fish, of which the following is a specification.

The shipment of live fish for restocking rivers and lakes is attended with many difficulties and great expense. The water should be maintained within a few degrees of a certain temperature and it should be aerated to replace the air and oxygen which is rapidly lost and is necessary to the life of the fish. Certain fish most difficult to transport successfully under any circumstances, such as trout, habitually seek the bottom of the container wherein the water is least affected by absorption of oxygen from the air and is most polluted by excrement.

Since a considerable body of water is less affected by change in the temperature of the surrounding air than a small amount, and does not become polluted so quickly, it has been customary to fill the containers comparatively full in spite of the fact that it is very desirable to compel the fish to remain near the surface of the water.

A type of container in common use is an ordinary can without a top, such for example as a standard 10-gallon milk can. It has been customary to transport these cans in cars specially built for the purpose, with insulated walls and provision for icing. An attendant must travel with them, constantly testing the temperature of each can, taking the necessary steps to maintain the proper temperature, and aerating the water by renewing it or by dipping it out and pouring it back again. In the case of a very small shipment not justifying the use of the special cars, the same amount of attention is necessary and the cost correspondingly high.

The object of my invention is to overcome difficulties heretofore experienced and to make it possible to ship live fish for long distances by any ordinary means with substantially no attention, the maintaining of the temperature of the water and aeration being automatically provided for.

A further object is to provide containers which achieve economy of space by so constructing them that they may be set one upon another if desired and when empty may be nested.

Broadly stated, my invention is a container having a supplemental compartment, the container to receive a body of water in which the supplemental compartment is partially immersed. The supplemental compartment is provided with means whereby water from the main body may circulate therethrough and be aerated. A feature of the invention is to retain the fish in the supplemental compartment where the water is purest and to utilize the activity of the fish in the aeration of the water in the supplemental compartment. The invention also provides means for controlling the temperature of the water.

One embodiment of my invention is illustrated by the accompanying drawings.

Figure 1:
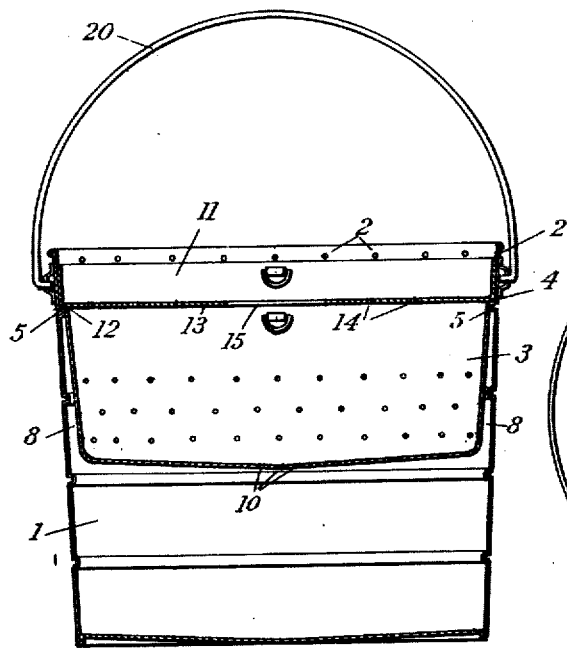
Figure 1 is a vertical section of the container.
Figure 3:
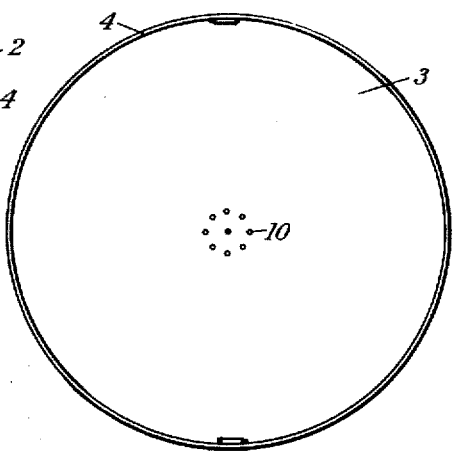
Figure 3 is a plan view of the lower tray.
Figure 2:
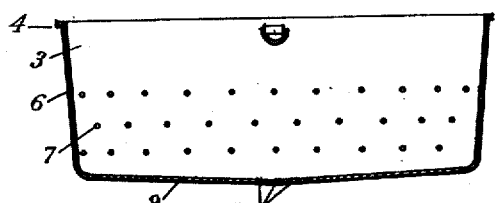
Figure 2 is a vertical section of the lower tray.
Figure 6:
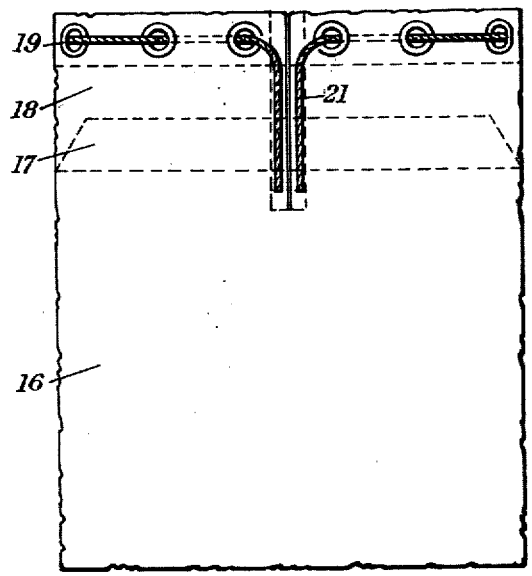
Figure 6 is an elevation of the jacket.
Figure 5:
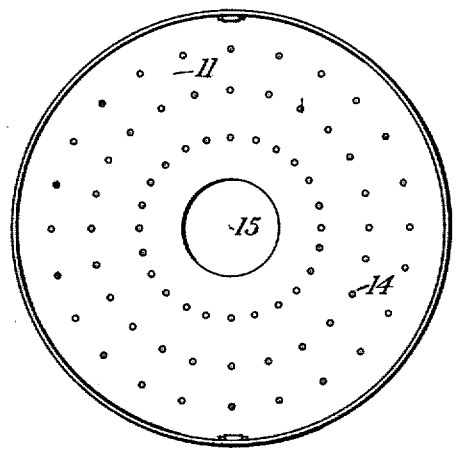
Figure 5 is a plan view of the top tray.
Figure 4:
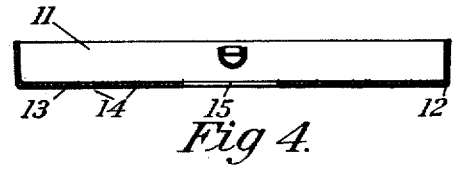
Figure 4 is a vertical section of the top tray.

The container consists of an outer receptacle 1, made of any suitable size and material with a series of perforations or vents 2 somewhat below the upper edge for the purpose of admitting air into the interior in case something is set on top of the container.

The bottom compartment or tray 3 fits into the outer receptacle 1, being held in place by the flanged edge 4 which rests upon the shoulder 5 of the outer receptacle. The body 6 of the bottom tray 3 is pierced by a number of small apertures 7, said body tapering from top to bottom more rapidly than the sides of the outer receptacle 1, providing an air space 8 between the sides of the bottom tray 3 and the outer receptacle 1. The bottom 9 of the tray 3 is shown dished downwardly somewhat and also perforated by several small holes 10 in the center.

The upper tray 11 also fits into the outer receptacle 1, the lower edge 12 resting upon the shoulder 5 of the outer receptacle. The bottom 13 of the upper tray 11 is perforated with a series of small apertures 14 and may also have a large central hole 15 to permit inspection of the interior.

In use the receptacle 1 is partially filled with water of a predetermined temperature until the depth in the bottom tray 3 is sufficient to submerge the bodies of the fish but preferably sufficiently shallow to prevent them from submerging their dorsal fins. An absorbent jacket 16 may then be drawn over the container and its inner flap 17 folded inwardly and down over the edge of the outer receptacle 1. Then the upper tray 11 is placed within the receptacle 1, and the inner flap 17 of the absorbent jacket 16 is thus held in position between the outer receptacle 1 and the upper tray 11, the width of the flap 17 being sufficient to permit it to extend below the bottom of the upper tray. The jacket 16 may then be moistened and is maintained in that state by the wick-like action of the flap 17 and the splashing of water from the lower tray 3 onto the projecting edge of the flap 17. The evaporation of moisture in the jacket 16 draws heat from the interior of the container thereby keeping the water sufficiently cool to permit the fish to live.

The outer flap 18 of the absorbent jacket 16 is shown split to permit it to be drawn over the top of the container and fastened by means of a drawstring 21 passing through the eyelets 19 without interfering with the bail 20.

Automatic aeration is accomplished by my invention in the following manner: The fish in the bottom tray 3 are compelled to remain almost at the surface of the water where the greatest amount of oxygen is present. When the container is in motion the swaying and jolting thereof will cause the water in the outer receptacle to move from side to side. Since water is incompressible and the body of water in the lower part of the outer receptacle 1 entirely fills the space between the bottom and sides of the outer receptacle 1 and the bottom of lower tray 3, this body of water can move only by virtue of the air space 8 between the sides of the outer receptacle 1 and lower tray 3, with the result that a portion of the water will be forced up into the air space 8 with considerable violence and pressure by the mass movement of the body of water in the lower part of the outer receptacle and will pass in small jets from the space 8 into the lower tray 3, not only through the perforations 7 in its sides which are below the normal surface of the water, but also through the perforations 7 which are above the surface of the water, falling therefrom through the air into the lower tray 3 and becoming aerated by its passage through the air.

The amount of water thus forced into the lower tray 3, will, because of the pressure to which it is subjected, be somewhat greater than the quantity which will flow out by its own weight through the limited number of perforations 10 below the surface, with a result that the level of water in the lower tray will be raised somewhat above the level of the water in the outer receptacle until a point is reached where the area of the perforations submerged by the water within the lower tray 3 is sufficient to compensate for this forced injection. In this way a higher level of water is maintained within the lower tray 3, which affords the fish greater freedom of action while the container is in motion.

When the container is stationary the water level within the lower tray 3 immediately returns to its normal level to be determined by the character of fish to be shipped. For example, in shipping large fish as distinguished from fry, the water should be of sufficient depth to permit the fish to swim about with their dorsal fins exposed above the surface. The fish then assist in the aeration of the water.

When the supply of oxygen in the water becomes depleted the fish begin to feel discomfort, which manifests itself in increased activity on their part and results in the splashing about of the water because of its extreme shallowness.

The upper tray 11 acts as a cover and baffle plate whenever the motion of the container is sufficient to cause the water to splash against it. The perforations 14 in the bottom of the upper tray 11 are of such dimensions that the water can not pass through in sufficient volume or with sufficient force to slop over, but will percolate back into the bottom tray 3 becoming aerated in the process.

The upper tray 11 also serves as a receptacle for supporting ice when considered necessary; as, for example, when shipping cold water fish such as trout in extremely hot weather. The perforations 14 permit the ice water to drip into the bottom tray 3 carrying with it a large supply of oxygen. Under such circumstances the outer flap 18 of the absorbent jacket 16 is drawn over the ice and retained in position by fastening means, such as drawstrings 21.

The bottom 9 of the tray 3 shown slightly dished and perforated at its lowest point, the center 10. The excrement of the fish settles to the bottom of the tray 3 and passes through perforations at the center 10 into the lower part of the container where it settles and remains on the bottom because of the comparative stillness of the water in that part.

A further advantage of the dish-shaped bottom 9 of the bottom tray 3, is that the greatest volume of water is in the center and consequently its motion is not likely to be so violent as to injure the fish. Furthermore, if the water should leak or spill out of the container that remaining would be concentrated in a single pool rather than spread over a wide area as would be the case if the bottom were flat.

If desired, the bottom tray 3 may be provided near its upper edge with a buoyant member 21 so that it will float and may be towed behind a boat during the collection of the fish to be transported. Such an arrangement is shown by Figure 7.

Figure 7:
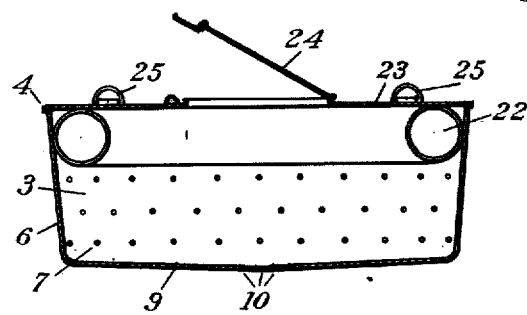
Figure 7 is a vertical section of a tray which may replace the other trays in case the container is used as a minnow bucket.
Figure 8:
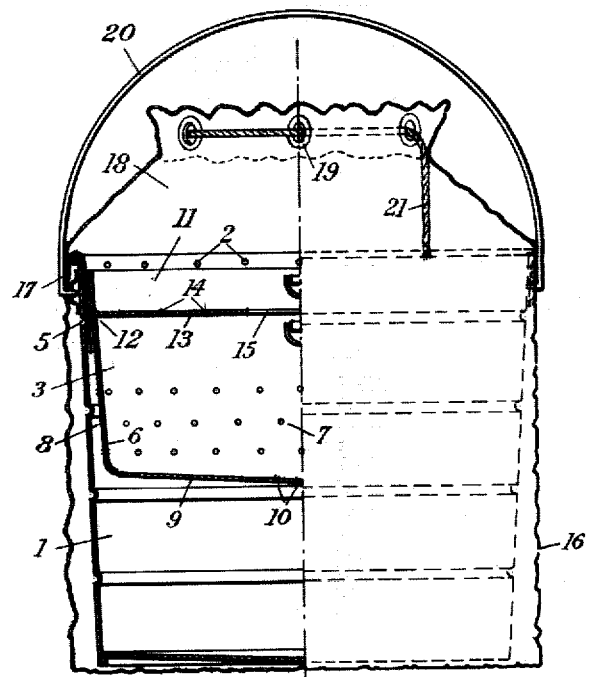
Figure 8 is a side elevation. partly in section, of the container with absorbent jacket in position.

Figure 7 also shows a desirable construction of bottom tray 3 when the container is to be used as a minnow bucket or fisherman's live bait pail. Float 22 is shown secured to the inside of bottom tray 3 near its upper edge. The cover 23 having a hinged lid 24 may be added. This device may be secured to a boat or other convenient object by means of a cord attached to rings 25. Furthermore, it may be placed within the outer receptacle 1 and will then perform the functions of the simple bottom tray 3 heretofore described, in addition to its function as a floating pail.

It will be understood that my invention is not limited in size or shape but is as readily applied to large shipping cars or tanks as to small portable devices such as I have particularly described, without departing from the spirit of the invention.

It will be further understood that the term "live fish" herein refers not only to fish of considerable size, but also to spawn and eggs, the shipment of which is attended by the same difficulties and problems as the shipment of larger fish. My invention is equally successful in overcoming these difficulties in the shipment of spawn or eggs. When shipping eggs it is obvious that lower tray 3 should have very small apertures 7 and 10 or that some suitable means may be employed to prevent the eggs from passing through the apertures.

I claim as my invention—

1. A receptacle of the class described provided with means for retaining live aquatic animals, such as fish, and the like, near the surface of the water in the receptacle so that the swimming efforts of the live animals will aerate the water by splashing it through the air of the receptacle, said retaining means having a substantially imperforate bottom and a body pierced by a number of small widely spaced apertures to jet the water forced therethrough to aerate the same, the greater number of said apertures being preferably spaced above the normal surface of the water contained in the receptacle.

2. A container of the class described having within it a means for retaining live fish or other aquatic animals, said means having a body pierced by a number of small widely spaced apertures, the majority of which are preferably spaced above the normal level of the water contained therein, and a substantially imperforate bottom which is so positioned with respect to the bottom of the container that it may be submerged below the surface of the water in the container sufficiently to permit the contained fish to swim about freely but compelling them to remain so close to the surface that their dorsal fins project above the surface, so that the swimming efforts of the fish will aerate the water by splashing it through the air of the container.

3. A receptacle of the class described, a compartment within the receptacle for confining live fish or other aquatic animals near the surface of the water in the receptacle, said compartment having a substantially imperforate bottom and a body pierced by a number of small widely spaced apertures, said body being so positioned within the receptacle that a splash chamber is provided between the body of the receptacle and the compartment above the surface of the water to permit the water from the receptacle to be aerated upon agitation of the receptacle.

4. A receptacle of the class described having within it a compartment for retaining live fish or other aquatic animals, the bottom of which is substantially imperforate and so positioned with respect to the bottom of the receptacle that it may be submerged below the surface of the water in the receptacle sufficiently to permit the contained fish to swim about freely but compelling them to remain so close to the surface that their dorsal fins project above the surface, and having an air space or splash chamber and a communicating means between said splash chamber and said compartment above the surface of the water whereby water which is forced up into the air space by movement of the main body of water in the receptacle will be injected through the communicating means into the air of the compartment to fall therethrough into the compartment, thereby aerating the water in the compartment.

5. A receptacle of the class described, having a compartment for retaining live fish or other aquatic animals near the surface of the water so positioned therein that an air space is formed between the sides of the receptacle and the compartment, the sides of the compartment having small widely spaced apertures communicating with the air space so that water, which is forced into the air space and through the apertures by agitation of the receptacle, will be jetted through the air into the compartment to aerate the water therein, a small section of the bottom of said compartment also having apertures to permit polluting matter to pass out of the compartment.

6. In a receptacle of the class described, a lower tray for retaining live fish or other animals near the surface of the water, the body of said tray being pierced by a number of small widely spaced apertures and formed, so that when positioned within the receptacle an air space is provided between the sides of the receptacle and the body of the tray, so that the water, which is forced up into the air space by movement of the main body of water in the receptacle, will be jetted through the communicating means and the air into the tray, thus becoming aerated; and an upper tray to receive a cooling medium which tray is provided with ventilating and water aerating apertures to cool and aerate the water within the lower tray.

7. A receptacle of the class described, a compartment for retaining live fish or other animals near the surface of the water, said compartment having a perforated body separated from the body of the receptacle by an air space, whereby water from the main body of water in the receptacle may, upon agitation thereof, be aerated within the compartment, and an absorbent jacket to surround the receptacle, and having means for supplying moisture to said jacket, whereby a substantially uniform temperature of the water within the receptacle may be maintained.

8. A device of the class described, comprising a receptacle for a body of water, a perforated cover for the receptacle to retain a cooling medium, such as ice, out of contact with the body of water, and an absorbent jacket to surround the receptacle, said jacket having a flap to enclose the perforated cover and the cooling medium and provided with retaining means for holding said flap and the jacket in close relation around the receptacle and its cover, said jacket being provided also with a capillary flap adapted to be positioned into contact with the body of water within the receptacle for supplying moisture to said jacket to maintain the water within the receptacle at a substantially uniform temperature.

9. A receptacle, a tray therein for live fish, said tray having a buoyant member, a body pierced by a number of widely spaced apertures and a substantially imperforate bottom, said body being formed so that when positioned within the receptacle an air space is provided between the sides of the receptacle and the body of the tray, to produce a splash chamber into which a portion of the water in the lower part of the receptacle may be forced by the mass movement of the body of water with sufficient force to cause it to be injected in a finely divided state through the apertures in the body of the tray above the surface of the water and into the tray in order to aerate the water in the tray.

10. The combination of a receptacle of the class described, means for retaining live fish in shallow water near the upper surface of the body of water in the receptacle, the retaining means having a substantially imperforate bottom except for a drain outlet and being so spaced with relation to the receptacle that a splash chamber is provided above the surface of the water between the sides of the receptacle and the retaining means, communicating means between said receptacle and said retaining means above the surface of the water whereby water from the main body of water in the receptable may, upon agitation of the body of water, be jetted in small quantities through the contained air to the retaining means, and a dish-shaped perforated cover positioned above the retaining means for receiving a cooling medium such as ice, which, when reduced to a fluid, will pass through the perforations of said cover into the retaining means, and further aerate the water therein.

EDGAR C. FEARNOW.